(12) United States Patent
Hattori et al.

(10) Patent No.: US 7,335,393 B2
(45) Date of Patent: *Feb. 26, 2008

(54) MAGNETIC PARTICLE, ITS PRODUCTION METHOD, MAGNETIC RECORDING MEDIUM AND ITS PRODUCTION METHOD

(75) Inventors: Yasushi Hattori, Kanagawa (JP); Koukichi Waki, Kanagawa (JP); Keizo Ogawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 561 days.

This patent is subject to a terminal disclaimer.

(21) Appl. No.: 10/896,079

(22) Filed: Jul. 22, 2004

(65) Prior Publication Data

US 2004/0261907 A1 Dec. 30, 2004

Related U.S. Application Data

(62) Division of application No. 10/448,435, filed on May 30, 2003.

(30) Foreign Application Priority Data

May 31, 2002 (JP) ............................. 2002-159906
Apr. 16, 2003 (JP) ............................. 2003-111379

(51) Int. Cl.
*B05D 5/12* (2006.01)
(52) U.S. Cl. ....................... 427/132; 427/130
(58) Field of Classification Search ............ None
See application file for complete search history.

(56) References Cited

U.S. PATENT DOCUMENTS

| 5,735,969 | A | 4/1998 | Lown et al. | |
| 5,989,728 | A | 11/1999 | Coffey et al. | |
| 6,994,895 | B2 * | 2/2006 | Hattori et al. | 427/599 |
| 2003/0059604 | A1 | 3/2003 | Hattori et al. | |
| 2004/0229086 | A1 * | 11/2004 | Takahashi et al. | 428/694 TS |
| 2006/0029741 | A1 * | 2/2006 | Hattori et al. | 427/383.1 |
| 2006/0194039 | A1 * | 8/2006 | Hattori et al. | 428/323 |

FOREIGN PATENT DOCUMENTS

| DE | 197 07 754 A1 | 9/1997 |
| JP | 48-58398 | 8/1973 |
| JP | 53-110920 | 9/1978 |
| JP | 56-33810 | 4/1981 |
| JP | 62-257705 | 11/1987 |
| JP | 3-169001 | 7/1991 |
| JP | 2001-256631 | 9/2001 |
| JP | 2003-073705 A | 3/2003 |
| JP | 2003-113401 A | 4/2003 |

OTHER PUBLICATIONS

Amar Kumbiiar, et al.; "Magnetic Properties of Cobalt and Cobalt-Platinum Alloy Nanoparticles Synthesized Via Microemulsion Technique", IEEE Transactions on Magnetics, vol. 37, No. 4, Jul. 2001: pp. 2216-2218.

* cited by examiner

*Primary Examiner*—John P Sheehan
(74) *Attorney, Agent, or Firm*—Sughrue Mion, PLLC

(57) ABSTRACT

The present invention relates to a method of producing a magnetic particle including forming a layer containing an alloy particle that can form CuAu type or $Cu_3Au$ type hard magnetic order alloy phase on a support, oxidizing the layer, and annealing the layer in non-oxidizing atmosphere. The invention also relates to a method of producing a magnetic particle including producing an alloy particle that can form hard magnetic order alloy phase, oxidizing the alloy particle, and annealing the particle in non-oxidizing atmosphere, and a magnetic particle produced by the foregoing production method. Further, the invention relates to a magnetic recording medium comprising a magnetic layer containing a magnetic particle and a method of producing a magnetic recording medium including forming a layer containing an alloy that can form the foregoing hard magnetic order alloy phase, oxidizing the layer, and annealing the layer in non-oxidizing atmosphere.

6 Claims, No Drawings

MAGNETIC PARTICLE, ITS PRODUCTION METHOD, MAGNETIC RECORDING MEDIUM AND ITS PRODUCTION METHOD

This is a Divisional of Application Ser. No. 10/448,435 filed May 30, 2003.

BACKGROUND OF THE INVENTION

1. Field of the Invention

The present invention relates to a magnetic particle and a production method thereof as well as a magnetic recording medium containing the magnetic particle in a magnetic layer and a production method thereof.

2. Description of the Related Art

To make the size of a magnetic particle contained in a magnetic layer is required in order to increase the magnetic recording density. For example, with respect to a magnetic recording medium to be widely used in form of a videotape, a computer tape, a disk or the like, in the case the weight of a ferromagnetic substance is same, the noise decreases with decrease in particle size.

As a hopeful material for the magnetic particle to improve the magnetic recording density, CuAu type or $Cu_3Au$ type hard magnetic order alloys (e.g. refer to Japanese Patent Application Laid-Open (JP-A) No. 2003-73705) can be cited. The hard magnetic order alloys have been known to have a high crystal magnetic anisotropy due to the strains generated in an ordering process and show hard magnetism even if the size of the magnetic particle is made small.

The magnetic particle showing the hard magnetism can be produced by a liquid-phase method and a vapor-phase method and especially, a magnetic particle immediately after the production by a liquid-phase method has a disorder phase and a face-centered cubic lattice structure.

The face-centered cubic lattice thus-generated generally shows soft magnetism or paramagnetism. A magnetic particle having soft magnetism or paramagnetism is not suitable for use as a recording media. In order to obtain a hard magnetic order alloy with a coercive force of 95.5 kA/m (1,200 Oe), required for a magnetic recording medium, it required to carry out annealing at a temperature not lower than a transformation temperature at which the disorder phase is transformed to the order phase.

In the case, the foregoing magnetic particle is produced by a liquid-phase method, the metal composing a magnetic particle is required to be annealed in a non-oxidizing atmosphere of such as Ar, $N_2$, so as not to be oxidized. However, according to the experiments performed by the inventors of the invention, when the alloy phase is ordered by annealing, occasionally, the transformation temperature is elevated. And the elevated transformation temperature causes problems in the heat resistance of a substrate, the production facilities, and the reproducibility of the magnetic characteristics.

SUMMARY OF THE INVENTION

As described above, the object of the present invention is to provide a method of producing a magnetic particle that enables the production of a magnetic particle with hard magnetism without increasing the annealing temperature, and a magnetic particle produced by the production method.

Also, the object of the invention is to provide a magnetic recording medium having a magnetic layer comprising the foregoing magnetic particle and the production method thereof.

According to the results of the earnest investigations to solve the above-mentioned problems, the inventors of the present invention have found that the above-mentioned object can be achieved by the invention described in the following. That is:

The first aspect of the invention is a method (A1) of producing a magnetic particle including forming on a support a layer containing alloy particles that can form a CuAu type or $Cu_3Au$ type hard magnetic order alloy phase, oxidizing the layer, and annealing the layer in a non-oxidizing atmosphere.

The second aspect of the invention is the method (A1) of producing a magnetic particle, wherein the atmosphere for the annealing is a reducing atmosphere, an annealing temperature is 450° C. or lower, and a retention time is 10 minutes or shorter.

The third aspect of the invention is the method (A1) of producing a magnetic particle, wherein a third element other than elements that can form the CuAu type or $Cu_3Au$ type hard magnetic order alloy phase, is added to the alloy particle as an alloying element.

The fourth aspect of the invention is a method (A2) of producing a magnetic particle including producing an alloy particle that can form a CuAu type or $Cu_3Au$ type hard magnetic order alloy phase, oxidizing the alloy particle, and annealing the particle in a non-oxidizing atmosphere.

The fifth aspect of the invention is the method (A2) of producing a magnetic particle, wherein the atmosphere for the annealing is a reducing atmosphere, an annealing temperature is 450° C. or lower, and a retention time is 10 minutes or shorter.

The sixth aspect of the invention is the method (A2) of producing a magnetic particle, wherein a third element other than elements that can form the CuAu type or $Cu_3Au$ type hard magnetic order alloy phase, is added to the alloy particle as an alloying element.

The seventh aspect of the invention is a magnetic particle (A3) produced by a method including forming on a support a layer containing alloy particles that can form a CuAu type or $Cu_3Au$ type hard magnetic order alloy phase, oxidizing the layer, and annealing the layer in a non-oxidizing atmosphere.

The eighth aspect of the invention is the magnetic particle (A3), wherein the atmosphere for the annealing is a reducing atmosphere, an annealing temperature is 450° C. or lower, and a retention time is 10 minutes or shorter.

The ninth aspect of the invention is the magnetic particle (A3), wherein a third element other than elements that can form the CuAu type or $Cu_3Au$ type hard magnetic order alloy phase, is added to the alloy particles as an alloying element.

The tenth aspect of the invention is a magnetic particle (A4) produced by a method including producing an alloy particle that can form a CuAu type or $Cu_3Au$ type hard magnetic order alloy phase, oxidizing the alloy particle, and annealing the particle in a non-oxidizing atmosphere.

The eleventh aspect of the invention is the magnetic particle (A4), wherein the atmosphere for the annealing is a reducing atmosphere, an annealing temperature is 450° C. or lower, and a retention time is 10 minutes or shorter.

The twelfth aspect of the invention is the magnetic particle (A4), wherein a third element other than elements that can form the CuAu type or $Cu_3Au$ type hard magnetic order alloy phase, is added to the alloy particle as an alloying element.

The thirteenth aspect of the invention is the magnetic recording medium (A5) comprising a magnetic layer containing magnetic particles produced by a method including forming on a support a layer containing alloy particles that can form a CuAu type or $Cu_3Au$ type hard magnetic order alloy phase, oxidizing the layer, and annealing the layer in a non-oxidizing atmosphere.

The fourteenth aspect of the invention is the magnetic recording medium (A5), wherein the atmosphere for the annealing is a reducing atmosphere, an annealing temperature is 450° C. or lower, and a retention time is 10 minutes or shorter.

The fifteenth aspect of the invention is the magnetic recording medium (A5), wherein a third element other than elements that can form the CuAu type or $Cu_3Au$ type hard magnetic order alloy phase, is added to the alloy particles as an alloying element.

The sixteenth aspect of the invention is a magnetic recording medium (A6) comprising a magnetic layer containing magnetic particles produced by a method including producing alloy particles that can form a CuAu type or $Cu_3Au$ type hard magnetic order alloy phase, oxidizing the alloy particles, and annealing the particles in non-oxidizing atmosphere.

The seventeenth aspect of the invention is the magnetic recording medium (A6), wherein the atmosphere for the annealing is a reducing atmosphere, an annealing temperature is 450° C. or lower, and a retention time is 10 minutes or shorter.

The eighteenth aspect of the invention is the magnetic recording medium (A6), wherein a third element other than elements that can form the CuAu type or $Cu_3Au$ type hard magnetic order alloy phase, is added to the alloy particles as an alloying element.

The nineteenth aspect of the invention is a method (A7) of producing a magnetic recording medium including forming on a support a layer containing an alloy that can form a CuAu type or $Cu_3Au$ type hard magnetic order alloy phase, oxidizing the layer, and annealing the layer in a non-oxidizing atmosphere.

The twentieth aspect of the invention is the method (A7) of producing a magnetic recording medium according to claim 19, wherein the atmosphere for the annealing is a reducing atmosphere, an annealing temperature is 450° C. or lower, and a retention time is 10 minutes or shorter.

DETAILED DESCRIPTION OF THE INVENTION

<<Magnetic Particle and its Production Method>>

The first method of producing the magnetic particle according to the present invention includes an alloy particle production step, in which an alloy particle that can form hard magnetic order alloy phase is produced by a liquid phase method or a vapor phase method; oxidation step, in which the produced alloy particle is oxidized; and annealing step, in which the alloy particle is annealed in a non-oxidizing atmosphere after oxidation.

Hereinafter, a method of producing a magnetic particle and magnetic particle of the invention will be described along with descriptions of the foregoing respective steps.

<Alloy Particle Production Step>

An alloy particle that can be converted to a magnetic particle by annealing can be produced by a vapor phase method or a liquid phase method. In consideration of suitability for mass production, the liquid phase method is preferable. As the liquid phase method, a variety of conventionally known methods can be applied. A reducing method, which is an improvement of the conventional method, is preferably employed and, among them, a reverse micelle method by which the particle size can be easily controlled is especially preferable.

(Reverse Micelle Method)

The reverse micelle method includes at least (1) a reduction step in which reduction reaction is proceeded by mixing two types of reverse micelle solutions and (2) an aging step in which aging is proceeded at a prescribed temperature after the reduction.

Hereinafter, the respective steps will be described.

(1) Reduction Step:

At first, a reverse micelle solution (I) is prepared by mixing a water-insoluble organic solvent containing a surfactant and an aqueous reducing agent solution.

As the foregoing surfactant, an oil-soluble surfactant is used. Specifically, sulfonate types (e.g. Aerosol OT (produced by Wako Pure Chemical Industries, Ltd.), quaternary ammonium salt types (e.g. cetyltrimethylammonium bromide), ether types (e.g. pentaethyleneglycol dodecyl ether) and the like can be exemplified.

The amount of the surfactant included in the water-insoluble organic solvent is preferably 20 to 200 g/l.

Preferable water-insoluble organic solvents to dissolve the surfactant are alkanes, ethers and alcohols.

As alkanes, alkanes having 7 to 12 carbons are preferable. Specifically, heptane, octane, isooctane, nonane, decane, undecane, dodecane and the like are preferable.

As ethers, diethyl ether, dipropyl ether, dibutyl ether and the like are preferable.

As alcohols, ethoxyethanol, ethoxypropanol and the like are preferable.

As the reducing agent included in an aqueous reducing agent solution, alcohols; polyalcohols; $H_2$; compounds containing HCHO, $S_2O_6^{-2}$, $H_2PO_2^-$, $BH_4^-$, $N_2H_5^+$, $H_2PO_3^-$, and the like are preferably used alone or in combination with two or more types of them.

The amount of the reducing agent in the aqueous solution is preferably 3 to 50 mole with respect to 1 mole of a metal salt.

Here, the mass ratio (water/surfactant) of water and the surfactant in the reverse micelle solution (I) is preferably 20 or lower. If the mass ratio exceeds 20, a precipitation tends to be formed and the particles tend to become uneven. The mass ratio is adjusted to be preferably 15 or lower, more preferably 0.5 to 10.

Besides, a reverse micelle solution (II) is prepared by mixing a water-insoluble organic solvent containing a surfactant and an aqueous metal salt solution.

The conditions (the substance to be used, the concentration, and the like) of the surfactant and the water-insoluble organic solvent are similar to those in the case of the reverse micelle solution (I).

Incidentally, the same solution as or a solution different from the reverse micelle solution (I) can be used. Further, the mass ratio of water and the surfactant in the reverse micelle solution (II) may be within the same range as that in the reverse micelle solution (I) and may be adjusted to be the same value as or a value different from that of the reverse micelle solution (I).

As the metal salt contained in the aqueous metal salt solution, it is preferable to select a proper metal salt so as to make a magnetic particle possible to form CuAu type or $Cu_3Au$ type ferromagnetic order alloy.

Here, as the CuAu type ferromagnetic order alloy, FeNi, FePd, FePt, CoPt, CoAu and the like can be exemplified and among them, preferable are FePd, FePt, and CoPt.

As the $Cu_3Au$ type ferromagnetic order alloy, $Ni_3Fe$, $FePd_3$, $Fe_3Pt$, $FePt_3$, $CoPt_3$, $Ni_3Pt$, $CrPt_3$, $Ni_3Mn$ can be exemplified and among them, preferable are $FePd_3$, $FePt_3$, $CoPt_3$, $Fe_3Pd$, $Fe_3Pt$, and $Co_3Pt$.

Specific examples of the metal salt include $H_2PtCl_6$, $K_2PtCl_4$, $Pt(CH_3COCHCOCH_3)_2$, $Na_2PdCl_4$, $Pd(OCOCH_3)_2$, $PdCl_2$, $Pd(CH_3COCHCOCH_3)_2$, $HAuCl_4$, $Fe_2(SO_4)_3$, $Fe(NO_3)_3$, $(NH_4)_3Fe(C_2H_4)_3$, $Fe(CH_3COCHCOCH_3)_3$, $NiSO_4$, $CoCl_2$, $Co(OCOCH_3)_2$ and the like.

The concentration of the aqueous metal salt solution (as the metal salt concentration) is preferably 0.1 to 1,000 µmol/ml, more preferably 1 to 100 µmol/ml.

Proper selection of the foregoing metal salt makes it possible to produce an alloy particle that can form the CuAu type or $Cu_3Au$ type ferromagnetic order alloy in which a base metal and a noble metal are alloyed.

It is required for the alloy particle to transform the alloy phase from the disorder phase to the order phase by annealing and in order to lower the transformation temperature, it is preferable to add the third element such as Sb, Pb, Bi, Cu, Ag, Zn, and In to the foregoing binary alloys. It is preferable to add previously precursors of the respective third elements to the metal salt solution. The addition amount is preferably 1 to 30 at %, more preferably 5 to 20 at % to the binary alloys.

The reverse micelle solutions (I) and (II) prepared in such a manner are mixed. The mixing method is not particularly limited, however taking the uniformity of reduction into consideration, it is preferable to carry out mixing by adding the reverse micelle solution (II) while stirring the reverse micelle solution (I). On completion of the mixing, the reduction is going to be caused and at that time, the temperature is preferably constant within a range from –5 to 30° C.

If the reduction temperature is lower than –5° C., problems such as freezing of the water phase that causes uneven reduction occur, and if it exceeds 30° C., flocculation or precipitation easily takes place and the reaction system becomes unstable in some cases. The reduction temperature is preferably 0 to 25° C., more preferably 5 to 25° C.

Here, the above-mentioned "constant temperature" means that the temperature is within the range of ±3° C., wherein the set temperature is defined as T (° C.). And the upper limit and the lower limit of the reducing temperature are still within the above-mentioned range of the temperature (–5 to 30° C.).

The duration of the reduction should be properly set depending on the amounts or the like of the reverse micelle solutions and is preferably 1 to 30 minutes, more preferably, 5 to 20 minutes.

It is preferable for the reduction to be carried out under higher speed stirring condition possible, since the process of the reduction significantly affects monodispersion of the particle size distribution.

A preferable stirring apparatus is a stirring apparatus having a high shearing force and specifically, the stirring apparatus is those in which stirring blades basically have a turbine type or a paddle type structure and further, the sharp edge are attached to the ends of the blades or the positions contacting the stirring blades, and the blades are rotated by a motor. More specifically, Dissolver (manufactured by Tokushu Kika Kogyo Co., Ltd.), Omnimixer (manufactured by Yamato Scientific Co., Ltd.), Homogenizer (manufactured by SMT) and the like are useful. By employing these apparatuses, type alloy particles having monodispersion distribution can be obtained in form of a stable dispersion.

It is preferable to add at least one kind of dispersants having 1 to 3 amino groups or carboxyl groups to at least one of the foregoing reverse micelle solutions (I) and (II) in an amount of 0.001 to 10 mole per 1 mole of the alloy particle to be produced.

Addition of such a dispersant makes it possible to obtain alloy particles free from flocculation having monodispersion distribution.

If the addition amount is less than 0.001 mole, the monodispersion property of the alloy particle cannot be improved in some cases and if it exceeds 10 mole, flocculation sometimes takes place.

As the foregoing dispersant, an organic compound having a group adhering to the surface of the alloy particle is preferable. Specifically, an organic compound having 1 to 3 groups selected from a group of amino groups, carboxyl groups, sulfonic acid groups, and sulfinic acid groups, are employed. They may be used alone or in combination of them.

The compound can be represented by a structural formula; $R-NH_2$, $NH_2-R-NH_2$, $NH_2-R(NH_2)-NH_2$, $R-COOH$, $COOH-R-COOH$, $COOH-R(COOH)-COOH$, $R-SO_3H$, $SO_3H-R-SO_3H$, $SO_3H-R(SO_3H)-SO_3H$, $R-SO_2H$, $SO_2H-R-SO_2H$, $SO_2H-R(SO_2H)-SO_2H$ wherein R denotes a linear, branched or cyclic saturated or unsaturated hydrocarbon.

A compound especially preferable as a dispersant is oleic acid. The oleic acid is a well-known surfactant for stabilizing colloids and has been used for protecting metal particles of such as iron or the like. Relatively long chain of the oleic acid (for example, oleic acid has a chain of 18 carbons with a length of about 20 Å (about 2 nm). Oleic acid is not an aliphatic compound but has one double bond) gives important steric hindrance canceling mutual magnetic reaction among particles.

In the same manner as the case of oleic acid, similar long chain carboxylic acids such as erucic acid, linoleic acid and the like (for example long chain organic acids containing 8 to 22 carbon atoms can be used alone or in combination) can be used. Oleic acid is an economical natural resource that is easily available (from olive oil or the like). Therefore, it is preferable. Oleylamine derived from the oleic acid is also a usable dispersant as well as oleic acid.

In the reduction step as described above, it is considered that metals with a lower redox potential [metals with about –0.2 V (vs. N. H. E) or lower] such as Co, Fe, Ni, Cr or the like to be contained in the CuAu type or $Cu_3Au$ type hard magnetic order alloy phase are reduced and precipitated in form of a particle having a monodispersion distribution and a minimum size. After that, in the temperature elevation step and an aging step to be described later, the precipitated base metal becomes a core and on its surface, metals with a higher redox potential [metals with about –0.2 V (vs. N. H. E) or higher] such as Pt, Pd, Rh and the like are reduced by the base metals and precipitated, replacing the base metals. It is supposed that the ionized base metals are reduced again by a reducing agent and precipitated. Such steps are repeated and an alloy particle that can form the CuAu type or $Cu_3Au$ type hard magnetic order alloy can be obtained.

(2) Aging Step:

On completion of the reduction, the solution after the reaction is heated to an aging temperature.

The foregoing aging temperature is preferably controlled at a constant temperature, which is higher than the temperature in the foregoing reduction and in the range of 30 to 90° C. The duration of aging is preferably 5 to 180 minutes. If the aging temperature is higher than the foregoing range or duration is longer than the foregoing range, flocculation and precipitation easily take place. On the contrary, if the temperature is lower than the foregoing range or the duration is shorter than the foregoing range, occasionally, the reaction can not be completed and, as a result, the composition of the alloy changes. The preferable aging temperature is 40 to 80° C., more preferably, 40 to 70° C. And preferable duration is 10 to 150 minutes, more preferably 20 to 120 minutes.

Here, the foregoing "constant temperature" means the same as the case of the temperature at the reduction (in this case, "the reduction temperature" is replaced with "the aging temperature"). Especially, the aging temperature is preferably at least 5° C., more preferably at least 10° C., higher than the reduction temperature, still being kept in the range of the foregoing aging temperature (30 to 90° C.). If the aging temperature is lower than the temperature 5° C. higher than the reduction temperature, it sometimes becomes impossible to obtain a prescribed composition.

In the aging step as described above, noble metals are precipitated on the base metals reduced and precipitated in the reduction step.

That is, reduction of the noble metals takes place only on the base metals and it does not occur that the base metals and noble metals are separately precipitated. Thus, an alloy particle that can form the CuAu type or $Cu_3Au$ type hard magnetic order alloy can be produced at a high yield with a prescribed composition ratio, and the composition can be controlled as desired. Also, by properly adjusting the stirring speed at the time of aging, the diameter of the alloy particle to be obtained can be controlled as desired.

After the foregoing aging, a washing and dispersing step is preferably carried out, in which the solution after the foregoing aging is washed with a mixed solution of water and a primary alcohol and after that, a precipitate is formed from the solution by a precipitation treatment with a primary alcohol, and dispersing the precipitate with an organic solvent.

By performing the washing and dispersing step, impurities are removed and the coating property in the case of formation of a magnetic layer of a magnetic recording medium by coating can be improved.

The foregoing washing and dispersing step may be carried out at least once, preferably twice, respectively.

The foregoing primary alcohol employed for washing is not particularly limited. And methanol, ethanol or the like is preferable. The mixing ratio by volume (water/primary alcohol) is preferably in the range of 10/1 to 2/1, more preferably in the range of 5/1 to 3/1.

If the water ratio is high, it becomes difficult to remove the surfactant in some cases and on the contrary, if the ratio of the primary alcohol is high, flocculation sometimes occurs.

As described above, the alloy particle dispersed in the solution (an alloy particle-containing solution) can be obtained.

Since the alloy particles have monodispersion distribution, even if it is applied to a support, the alloy particles are not flocculated and maintain the uniformly dispersed state. Accordingly, the respective particles are not flocculated even if annealing treatment is carried out, the alloy particle can be efficiently given hard magnetism and is excellent in coating suitability.

The diameter of the alloy particle before the oxidation, which will be described later, is preferably small in terms of suppression of noise, however if it is too small, the particle occasionally becomes superparamagnetic after annealing and becomes unsuitable for use in magnetic recording. Generally the diameter of the alloy particle is preferably 1 to 100 nm, more preferably 1 to 20 nm, further preferably 3 to 10 nm.

(Reduction Method)

There are a variety of methods for producing the alloy particle that can form a CuAu type or $Cu_3Au$ type hard magnetic order alloy by reduction. A method is preferable in which a metal with a lower redox potential (hereinafter, simply referred to as "a base metal" in some cases) and a metal with a higher redox potential (hereinafter, simply referred to as "a noble metal") are reduced with a reducing agent or the like in an organic solvent, water, or a mixed solution of an organic solvent and water.

The sequence of the reduction of the base metal and the noble metal is not particularly limited and both may be simultaneously reduced.

As the foregoing organic solvent, alcohol, polyalcohol and the like can be used and methanol, ethanol, butanol and the like can be cited as the alcohol and ethylene glycol, glycerin and the like can be cited as the polyalcohol.

Examples of the CuAu type or $Cu_3Au$ type hard magnetic order alloy are the same as exemplified in the above-mentioned reverse micelle method.

Also, as a method for producing an alloy particle by precipitating the noble metal before the base metal, a method disclosed in paragraph 18 to 30 in Japanese Patent Application No. 2001-269255 can be employed.

As the metal with a higher redox potential, Pt, Pd, Rh and the like are preferable to be employed and $H_2PtCl_2.6H_2O$, $Pt(CH_3COCHCOCH_3)_2$, $RhCl_3.3H_2O$, $Pd(OCOCH_3)_2$, $PdCl_2$, $Pd(CH_3COCHCOCH_3)_2$ and the like can be used while being dissolved in a solvent. The concentration of the metal in a solution is preferably 0.1 to 1,000 µmol/ml, more preferably 0.1 to 100 µmol/ml.

As the metal with a lower redox potential, Co, Fe, Ni, and Cr are preferable to be employed and especially preferable one is Fe and Co. As such a metal, $FeSO_4.7H_2O$, $NiSO_4.7H_2O$, $CoCl_2.6H_2O$, $Co(OCOCH_3)_2.4H_2O$ can be used by dissolving them in a solvent. The concentration of the metal in a solution is preferably 1 to 1,000 µmol/ml, more preferably 0.1 to 100 µmol/ml.

Further, similarly to the case of employing foregoing reverse micelle method, it is preferable to lower the transformation temperature to the hard magnetic order alloy by adding the third element to a binary alloy. The addition amount is same as that in the case of the reverse micelle method.

For example, in a case a base metal and a noble metal are successively reduced in this order by using a reducing agent, it is preferable to carry out the reduction as follows: the base metal or the base metal with a portion of the noble metal reduced with a reducing agent having a reduction potential lower than −0.2 V (vs. N.H.E) is added to a noble metal source and reducing the mixture with a reducing agent having a redox potential higher than −0.2 V (vs. N.H.E), and after that, reducing the mixture with a reducing agent having a reduction potential lower than −0.2 V (vs. N.H.E).

Although the redox potential depends on the pH in the reaction system, as the reducing agent with a redox potential higher than −0.2 V (vs. N.H.E), alcohols such as 1,2-hexadecanediol; glycerin compounds; $H_2$; and HCHO are preferably used.

As the reducing agent with a redox potential lower than −0.2 V (vs. N.H.E), $S_2O_6^{2-}$, $H_2PO_2^-$, $BH_4^-$, $N_2H_5^+$, and $H_2PO_3^-$ are preferably used.

Here, in the case a 0 valent metal compound such as Fe carbonyl is used as a raw material of the base metal, a reducing agent is not particularly required.

In reduction precipitation of the noble metal, an alloy particle can be stably produced in the presence of an adsorbent. As the adsorbent, a polymer and a surfactant can be preferably used.

As the foregoing polymer, polyvinyl alcohol (PVA), poly (N-vinyl-2-pyrrolidone) (PVP), gelatin and the like can be exemplified. Among them, especially preferable one is PVP.

The molecular weight of the polymer is preferably 20,000 to 60,000, more preferably 30,000 to 50,000. The amount of the polymer is preferably 0.1 to 10 times, more preferably 0.1 to 5 times, the weight of the alloy particles to be produced.

The surfactant preferably used as the adsorbent preferably contains "an organic stabilizer", which is a long chain organic compound represented by the general formula: R—X. In the formula, R denotes "a tale group", which is a linear or branched hydrocarbon or fluorocarbon chain and generally contains 8 to 22 carbon atoms. And X represents "a head group", which is a portion (X) giving a specified chemical bond to the surface of the alloy particle and preferably selected from the group of sulfinate (—SOOH), sulfonate (—SO$_2$OH), phosphinate (—POOH), phosphonate (—OPO(OH)$_2$), carboxylate, and thiol.

The foregoing organic stabilizer is preferably selected from the group of sulfonic acid (R—SO$_2$OH), sulfinic acid (R—SOOH), phosphinic acid (R$_2$POOH), phosphonic acid (R—OPO(OH)$_2$), carboxylic acid (R—COOH), and thiol (R—SH). Among them, similarly to the reverse micelle method, oleic acid is especially preferable.

The combination of the foregoing phosphine and the organic stabilizer (e.g. triorganophosphine/acid) can provide excellent controllability to the growth and stabilization of the particle. Although didecyl ether and didodecyl ether can be used, phenyl ether and n-octyl ether can be used preferably as a solvent due to the low cost and high boiling point of them.

The reaction is carried out preferably in the range of 80° C. to 360° C., and more preferably in the range of 80° C. to 240° C., depending on the required alloy particle and the boiling point of the solvent. The particle does not grow if the temperature is lower than the temperature range in some cases. If the temperature is higher than the range, the particle grows without control and undesirable by-products may grow in some cases.

Similarly to that in the reverse micelle method, the particle size of the alloy particle is preferably 1 to 100 nm, more preferably 3 to 20 nm, and further preferably 3 to 10 nm.

A seed crystallization method is effective as the method for increasing the particle size (the particle diameter). In the case the alloy particle is used as a magnetic recording medium, it is preferable to pack the alloy particle in the closest packing state in order to increase the recording capacity. For achieving the closest packingt, the standard deviation of the size of the alloy particle is preferably less than 10%, more preferably 5% or less. The variation coefficient of the particle size is preferably less than 10%, more preferably 5% or less.

If the particle size is too small, the alloy particle becomes super-paramagnetic and this phenomenon is not preferable. Therefore, in order to enlarge the particle size, the seed crystallization method is preferable as described above. In the process of the seed crystallization, a metal having higher redox potential than the metals composing the particle sometimes precipitates. In such a case, oxidation of the particle is considered to occur. Accordingly, the particle is preferably hydrogenated prior to the seed crystallization.

It is preferable for a noble metal to form an outermost layer of the alloy particle from a viewpoint of oxidation prevention. However, particle having an outermost layer composed of a noble metal flocculate easily. According to the invention, an alloy of a noble metal and a base metal is preferable for the layer. Such a constitution can be formed easily and efficiently by a liquid-phase method.

Removal of salts from the solution after the alloy particle synthesis is preferable in terms of improvement of the dispersion stability of the alloy particle. To remove the salts, an alcohol is added excessively to cause slight flocculation, spontaneously or centrifugally cause precipitation, and remove the salts together with the supernatant solution. However, such a method easily causes flocculation. Hence, an ultra filtration method is preferable to be employed. Thus, the alloy particle dispersed in a solution (an alloy particle-containing solution) can be obtained.

A transmission electron microscope (TEM) may be employed for the particle size evaluation of the alloy particle. Although electron diffraction by TEM can be employed to determine crystal system of the alloy particle or the magnetic particle, x-ray diffraction is preferably employed since it has a high precision. For the composition analysis of the inside of the alloy particle or the magnetic particle, FE-TEM equipped with EDAX which emits a convergent electron beam, may be preferably employed for the evaluation. Further, the evaluation of the magnetic property of the alloy particle or the magnetic particle can be carried out using VSM.

<Oxidation Step>

By oxidizing thus-obtained alloy particle, a magnetic particle with hard magnetism can be efficiently produced without elevating the temperature at annealing in a non-oxidizing atmosphere thereafter. That is supposedly attributed to the phenomenon described as follows.

That is, at first, oxygen enters in the crystal lattice by oxidizing the alloy particle. When annealing is carried out with invasion of the oxygen in the lattice, oxygen is dissociated from the crystal lattice by the heat. Defects are generated by the dissociation of oxygen and since the metal atoms composing the alloy easily translocate through the defects, phase transformation is supposedly caused easily even at a relatively low temperature.

Such a phenomenon can be supported by measuring the EXAFS (expanded range x-ray absorption fine structure) of the alloy particle after the oxidation and the magnetic particle subjected to the annealing.

For example, in a Fe—Pt alloy particle not experiencing the oxidizing treatment, a bond between a Fe atom and a Pt atom or a Fe atom can be confirmed.

On the contrary, in an alloy particle experiencing the oxidation treatment, a bond between a Fe atom and an oxygen atom can be confirmed. On the other hand, a bond between a Fe atom and a Pt atom and a Fe atom are scarcely observed. That means the bonds of Fe—Pt, Fe—Fe are cut by oxygen atoms. Accordingly it is supposed that Pt atoms and Fe atoms become easy to move at annealing.

Then, after the alloy particle is annealed, existence of oxygen cannot be confirmed and existence of bonds between a Fe atom and a Pt atoms or a Fe atom in the surrounding of a Fe atom can be confirmed.

Taking the above-mentioned phenomenon into consideration, it can be understood that the phase transformation is difficult to proceed without oxidation and the annealing temperature is required to be high without oxidation. However, if oxidation is carried out to an excess extent, the mutual reaction between oxygen and a metals that is easy to be oxidized such as Fe becomes so intense as to produce a metal oxide.

Accordingly, control of the oxidation state of the alloy particle becomes important and therefore, it is required to proceed the oxidation at the optimistic condition.

The oxidation can be carried out, for example, in the case of production of the alloy particle by the liquid phase method as described above, by supplying a gas containing at least oxygen to the produced alloy particle-containing solution.

The partial pressure of the oxygen is preferably 10 to 100%, more preferably 15 to 50%, of the total pressure.

The oxidation temperature is preferably 0 to 100° C., more preferably 15 to 80° C.

The oxidation state of the alloy particle is preferably evaluated by EXAFS and the like. The number of bonds of a base metal such as Fe with oxygen is preferably 0.5 to 4, more preferably 1 to 3, from a viewpoint of cutting the Fe—Fe bonds and Pt—Fe bonds by oxygen.

Further, the foregoing alloy particle can be oxidized being coated or fixed on a support by exposure to the air at a room temperature (0 to 40° C.). Oxidation of the alloy particle being coated on a support prevents the flocculation of the alloy particle. The duration of the oxidation is preferably 1 to 48 hours, more preferably 3 to 24 hours.

<Annealing Treatment>

The alloy particle after the oxidation is in disorder phase. The alloy particle in a disorder phase can not attain hard magnetization as described above. Therefore, in order to convert the phase of the alloy particle to the order phase, a heating treatment (annealing) is required to be conducted on the alloy particle. The transformation temperature, at which the alloy composing the alloy particle order-disorder transforms, can be obtained by using a differential thermal analyzer (DTA). It is required to carry out the heating treatment at a temperature equal to or higher than the transformation temperature.

The foregoing transformation temperature is generally about 500° C., however it is sometimes decreased by addition of the third element. Further, the transformation temperature can be decreased by changing the atmosphere at the above-mentioned oxidation and annealing properly. Accordingly, the annealing temperature is preferably adjusted to be 150° C. or higher, more preferably 150 to 450° C.

Representative magnetic recording media are a magnetic recording tape and a floppy (R) disk. They are produced by forming a magnetic layer in web state on a support, which is composed of an organic substance, and then processing the resultant substrate into a tape-state for the former and punching the substrate into a disk-state for the latter. The invention is effective in the case an organic support is used since the transformation temperature to the ferromagnetism can be lowered. Thus, the invention can preferably applied to such mediums.

When annealing the alloy in a web state, annealing duration is preferably short. That is because if the annealing duration is long, the apparatus becomes very large and long. For example, in the case the annealing duration is set at 30 minutes and the transportation speed of a web is set at 50 m/min, the line length becomes as long as 1,500 m. Therefore, in a method of producing a magnetic particle of the invention, the annealing duration is preferably 10 minutes or shorter, more preferably 5 minutes or shorter.

In order to shorten the annealing duration as described above, the annealing is preferably proceeded at a reducing atmosphere as described later. Shortening of the annealing duration is effective in prevention of a deformation of the support and a diffusion of impurities from the support.

If the alloy is annealed in a particle state, the particle easily moves to cause fusion of the particles. Therefore, although a high coercive force can be obtained, the resultant magnetic recording medium tends to have a disadvantage that the particle size becomes large. Accordingly, the alloy particle is preferably annealed being coated on a support or the like in terms of prevention of flocculation of the alloy particle.

Further, by annealing an alloy particle on a support to give a magnetic particle, a magnetic recording medium comprising a magnetic layer containing such a magnetic particle can be obtained.

As the support, both inorganic and organic supports can be used as long as they are usable for a magnetic recording medium.

As a support of an inorganic material, Al, an Mg alloy such as Al—Mg, Mg—Al—Zn and the like, glass, quartz, carbon, silicon, ceramic and the like can be employed. Those supports are excellent in impact resistance and have rigidity suitable for thinning and high-speed rotation. Further, as compared with a support of an organic material, they are more resistant to heat.

As a support of an organic material, polyesters such as polyethylene terephthalate, polyethylene naphthalate; polyolefins; cellulose triacetate; polycarbonate; polyamide (including aliphatic polyamide and aromatic polyamide such as aramide); polyimide; polyamideimide; polysulfone; polybenzoxazole; and the like can be employed.

To coat the alloy particle on a support, a variety of additives are added, if necessary, to a solution containing an alloy particle after the foregoing oxidation and the mixture is coated on a support.

The content of the alloy particle is preferably a desired concentration in a range of 0.01 to 0.1 mg/ml.

As a method for coating the alloy particle on a support, air doctor coat, blade coat, rod coat, extrusion coat, air knife coat, squeezing coat, impregnation coat, reverse roll coat, transfer roll coat, gravure coat, kiss coat, cast coat, spray coat, spin coat, and the like can be employed.

The atmosphere at annealing should be a non-oxidizing atmosphere of $H_2$, $N_2$, Ar, He, Ne and the like in order to efficiently promote phase transformation and prevent oxidation of the alloy.

Particularly, in terms of dissociation of oxygen having entered in the lattice by oxidation, the annealing is conducted preferably in a reducing atmosphere of such as methane, ethane, $H_2$, and the like. Further, in terms of particle diameter retention, annealing is preferably carried out in a magnetic field under the reducing atmosphere. Incidentally, in the case $H_2$ atmosphere is employed, an inert gas is preferably added in terms of prevention of explosion.

Further, in order to prevent fusion of the particle at annealing, it is preferable to carry out annealing once at a temperature equal to or lower than the transformation temperature in an inert gas to carbonize the dispersant and then carry out annealing at a temperature equal to or higher than the transformation temperature in a reducing atmosphere. In this case, the most preferable embodiment is that after the foregoing annealing is carried out at a temperature equal to or lower than the transformation temperature, depending on the necessity, a Si-type resin or the like is coated on the layer of the alloy particle and then the annealing is carried out at a temperature equal to or higher than the transformation temperature.

By carrying out such annealing as described above, the alloy particle is transformed from the disorder phase to order phase and a magnetic particle exhibiting hard magnetism can be obtained.

A magnetic particle produced by the above-mentioned method of producing a magnetic particle of the invention preferably has a coercive force of 95.5 to 398 kA/m (1,200 to 5,000 Oe). And in the case it is applied to a magnetic recording medium, it more preferably has a coercive force of 95.5 to 278.6 kA/m (1,200 to 3,500 Oe) in consideration of the compatibility of a recording head.

Further, the particle diameter of the magnetic particle is preferably 1 to 100 nm, more preferably 3 to 20 nm, and further preferably 3 to 10 nm.

A second method of producing magnetic particle according to the invention includes steps of forming a layer containing an alloy particle that can form CuAu type or $Cu_3Au$ type hard magnetic order alloy phase on a support, subjecting it to oxidation treatment, and then annealing it in non-oxidizing atmosphere.

The production method includes some common points with the above-mentioned first method of producing a magnetic particle, however it differs from the first method in a point that the foregoing alloy particle is produced by being directly precipitated on a support and subjected to oxidation and annealing treatment.

As the foregoing precipitation method, any method which can precipitate a desired alloy particle on a support and form a layer containing the alloy particle can be employed without limitation. A sputtering film formation method is preferable for the production.

The sputtering film formation method includes "RF magnetron sputtering method (hereinafter, sometimes referred to as "RF sputtering method"), "DC magnetron sputtering method", and the like and any of them can be employed. The "RF sputtering method is preferable since it can efficiently form an alloy particle that can form CuAu type or $Cu_3Au$ type hard magnetic order alloy phase.

Segregation of Si, Cr or the like in crystal grain boundaries is preferable to lower the magnetization unit and suppress the noise.

The CuAu type or $Cu_3Au$ type order alloy film formed by sputtering is paramagnetic or soft magnetic and becomes hard magnetic by annealing. In this case, according to the invention, annealing in non-oxidizing atmosphere, preferably in reducing atmosphere, after oxidation is effective in terms of lowering the transformation temperature.

The oxidation after the film formation is preferably conducted by a method similar to the first production method, in which oxidation is carried out by exposure to the air.

After the oxidation is carried out, the alloy particle is annealed under the same conditions as those of the first production method to obtain a magnetic particle having hard magnetism.

<<Magnetic Recording Medium>>

A magnetic recording medium of the invention comprises a magnetic layer containing a magnetic particle which is produced by the method of producing a magnetic particle of the invention described above.

The magnetic recording medium includes a magnetic tape such as a video tape, a computer tape and the like; a magnetic disk such as a floppy (R) disk, a hard disk and the like.

In the case an alloy particle (an alloy particle-containing solution) is coated on a support and annealed to obtain a magnetic particle as described above, a layer containing such a magnetic particle can be a magnetic layer.

Further, in the case the alloy particle is annealed in a particle state rather than annealed while being coated on a support to produce a magnetic particle, a coating solution is prepared by kneading the magnetic particle by an open kneader, three-roll mill and the like and then finely dispersing the magnetic particle by a sand grinder or the like and then the coating solution is coated on a support by a known method to form a magnetic layer.

Further as described in "the second method of producing a magnetic particle according to the invention", the magnetic recording medium may be produced by forming a layer containing an alloy that can form CuAu type or $Cu_3Au$ type hard magnetic order alloy phase on a support by the sputtering film formation method, oxidizing it, and annealing it in non-oxidizing atmosphere to form a magnetic layer.

In this case, the oxidation can be performed by the above-mentioned exposure to air at a room temperature (0 to 40° C.). Further, the annealing is preferable to be carried out in the manner as described in "the first method of producing a magnetic particle according to the present invention".

Although it depends on the type of the subject magnetic recording medium, the thickness of the magnetic layer to be formed is preferably 4 nm to 1 µm, more preferably 4 nm to 100 nm.

The magnetic recording medium of the invention may comprise another layer, if necessary, in addition to the magnetic layer. For example, in the case of a disk, a magnetic layer or a non-magnetic layer is preferably formed further on the face opposite to the magnetic layer. In the case of a tape, a back layer is preferably formed on the face of an insoluble support opposite to the magnetic layer.

Further, the wear resistance is improved by forming an extremely thin protection film on the magnetic layer and further the sliding property is improved by coating a lubricant on the protection film to obtain a magnetic recording medium with sufficiently high reliability.

As a material for the protection film, oxides such as silica, alumina, titania, zirconia, cobalt oxide, nickel oxide and the like; nitrides such as titanium nitride, silicon nitride, boron nitride and the like; carbides such as silicon carbide, chromium carbide, boron carbide and the like; carbon such as graphite, amorphous carbon and the like can be exemplified and especially preferable one is a hard amorphous carbon generally so called diamond-like carbon.

The carbon protection film composed of carbon is an extremely thin film having a sufficient wear resistance and scarcely causing baking in a sliding member, therefore is suitable for material for a protection film.

As a method for forming a carbon protection film, a sputtering method is generally employed in the case of a hard disk and many methods employing plasma CVD with a higher film formation rate have been proposed for the products such as a video tape and the like which require continuous film formation. Accordingly, these methods are preferably employed.

Among them, it is reported that a plasma injection CVD (PI-CVD) method has an extremely high film formation rate and is capable of providing a carbon protection film which is hard, has few pin holes, and is excellent as a protection film (for example, JP-A Nos. 61-130487, 63-279426 and 3-113824).

The carbon protection film preferably has Vickers hardness of 1,000 kg/mm$^2$ or higher, more preferably 2,000 kg/mm$^2$. Further, its crystal structure is preferably an amorphous structure. And the protection film is preferably non-conductive.

In the case a diamond-like carbon film is used as a carbon protection film, the structure can be confirmed by Raman scattering spectroscopy. That is, in a case a diamond-like carbon film is measured, the structure can be confirmed by detection of a peak at 1,520 to 1,560 cm$^{-1}$. If the structure of the carbon film is shifted from the diamond-like structure, the peak detected by the Raman spectrometry is shifted from the foregoing range and the hardness as a protection film is lowered.

As a carbon raw material for forming the carbon protection film, carbon-containing compounds, for example, alkanes such as methane, ethane, propane, butane and the like; alkenes such as ethylene, propylene and the like; alkynes such as acetylene and the like are preferably used. Further, if necessary, a carrier gas such as argon and an addition gas such as hydrogen, nitrogen and the like for improving the film quality may be added.

If the film thickness of the carbon protection film is thick, the electromagnetic conversion property is deteriorated and the adhesion strength to the magnetic layer is decreased. And if the film thickness is thin, the wear resistance becomes insufficient. Accordingly, the film thickness is preferably 2.5 to 20 nm, more preferably 5 to 10 nm.

Further, in order to improve the adhesion strength between the protection film and the magnetic layer to be a substrate, it is preferable to previously etch the surface of the magnetic layer with an inert gas or to carry out surface modifying by exposing the magnetic layer to a reactive gas plasma such as oxygen.

The magnetic layer may be formed to have a layered structure to improve the electromagnetic conversion property or may have a known non-magnetic under layer and intermediate layer thereunder. In order to improve the running durability and corrosion resistance, as described above, a lubricant or a rust-preventing agent is preferably supplied to the foregoing magnetic layer or the protection film. As the lubricant to be supplied, known hydrocarbon-type lubricants, fluorine-type lubricants, and extreme pressure agent and the like can be used.

Examples of the hydrocarbon-type lubricants include carboxylic acids such as stearic acid, oleic acid, and the like; esters such as butyl stearate and the like; sulfonic acids such as octadecylsulfonic acid and the like; phosphoric acid esters such as monooctadecyl phosphate; alcohols such as stearyl alcohol, oleyl alcohol, and the like; carboxylic acid amides such as stearic acid amide; and amines such as stearylamine and the like.

The examples of the fluorine-type lubricants include lubricants obtained by substituting some or all of the alkyl groups of the foregoing hydrocarbon-type lubricants with fluoroalkyl groups or perfluoropolyether groups.

The perfluoroether groups include perfluoromethylene oxide polymers, perfluoroethylene oxide polymers, perfluoro-n-propylene oxide polymers $(CF_2CF_2CF_2O)_n$, perfluoroisopropylene oxide polymers $(CF(CF_3)CF_2O)_n$, or their copolymers.

Further, compounds which are the hydrocarbon-type lubricants having polar functional groups such as hydroxyl groups, ester groups, carboxyl groups and the like in the terminals of the alkyl groups and in the molecules are effective in lowering the friction force, thus are suitable.

The molecular weights of them are preferably 500 to 5,000, more preferably 1,000 to 3,000. If it is less than 500, the evaporation property becomes high and the lubricating property becomes low in some cases. Further, if it exceeds 5,000, since the viscosity becomes high, a slider and a disk easily stick to each other to result in occurrence of running stoppage and head crush.

As the perfluoro ethers, those in trade name of FOMBLIN manufactured by Ausimont K.K., KRYTOX manufactured by Du Pont K.K. and the like are commercialized.

Examples of the extreme pressure agents include esters such as phosphoric acid esters such as trilauryl phosphate, phosphorous acid esters such as trilauryl phosphite, thiophosphorous acid esters such as trilauryl trithiophosphite, thiophosphoric acid and the like; sulfur-type extreme pressure agents such as dibenzyl disulfide and the like can be exemplified.

The foregoing lubricants can be used alone or in combination of a plurality of them. The methods for coating these lubricants on the magnetic layer or the protection film may involve steps of dissolving such a lubricant in an organic solvent and coating the solution on the layer by a wire bar method, a gravure method, a spin coat method, a dip coat method, and the like, or depositing the lubricant on the layer by a vacuum evaporation.

Examples of the rust-preventing agents include nitrogen-containing heterocyclic compounds such as benzotriazole, benzimidazole, purine, pyrimidine and the like and their derivatives obtained by introducing alkyl side chains into the mother cores of them; nitrogen- and sulfur-containing heterocyclic compounds such as benzothiazole, 2-mercaptobenzothiazole, tetrazaindene cyclic compounds, thiouracyl compounds and the like and their derivatives.

As described above, in the case the magnetic recording medium is a magnetic tape, a back coat layer (a backing layer) may be formed on the face of a non-magnetic support where the magnetic layer is not formed. The back coat layer is a layer formed by coating a coating material for back coat layer formation obtained by dispersing granular components such as an abrading material, an antistatic agent and the like and a binder in a known organic solvent, on the face of the non-magnetic support where the magnetic layer is not formed.

As the granular components, a variety of inorganic pigments and carbon black may be used and as the binder, nitrocellulose, phenoxy resin, vinyl chloride-based resin, polyurethane type resin may be used solely or in combination.

Further, a known adhesive layer may be formed on the face to be coated with an alloy particle-containing solution and the face where the back coat layer is to be formed.

The magnetic recording medium produced in such a manner has an centerline average of the surface in the range of preferably 0.1 to 5 nm, more preferably 1 to 4 nm, with a cut-off value of 0.25. That is because it is preferable for the magnetic recording medium for high density recording to make the surface have extremely excellent smoothness as described above.

As a method for obtaining such a surface, a method for carrying out calendering treatment after the magnetic layer formation can be exemplified. Further, varnishing treatment may be carried out.

The obtained magnetic recording medium may be properly punched out by a punching apparatus or cut into a desired size by a cutting machine or the like, and used.

EXAMPLES

Hereinafter, the present invention will be described in details along with examples, however the invention is not limited to these examples.

Example 1

(Production of FePt Alloy Particle)

The following steps were carried out in highly pure $N_2$ gas.

A reverse micelle solution (I) was prepared by adding and mixing an alkane solution containing 10.8 g of Aerosol OT (produced by Wako Pure Chemical Industries, Ltd.), 80 ml of decane (produced by Wako Pure Chemical Industries, Ltd.), and 2 ml of oleylamine (Tokyo Kasei Kogyo Co., Ltd.) to and with an aqueous reducing agent solution containing 0.76 g of $NaBH_4$ (produced by Wako Pure Chemical Industries, Ltd.) dissolved in 16 ml of water (deoxygenation: 0.1 mg/L or lower).

A reverse micelle solution (II) was prepared by adding and mixing an alkane solution containing 5.4 g of Aerosol OT and 40 ml of decane to and with an aqueous metal salt solution containing 0.46 g of iron triammonium trioxalate $(Fe(NH_4)_3(C_2O_4)_3)$ (produced by Wako Pure Chemical Industries, Ltd.) and 0.38 g of potassium chloroplatinate $(K_2PtCl_4)$ (produced by Wako Pure Chemical Industries, Ltd.) dissolved in 12 ml of water (deoxygenated).

While the reverse micelle solution (I) was stirred at 22° C. at a high speed by Omni mixer (manufactured by Yamato Scientific Co., Ltd.), the reverse micelle solution (II) was added in an instant. After 10 minutes, while being stirred by a magnetic stirrer, the resultant mixture was heated to 50° C. and aged for 60 minutes.

After mixed with 2 ml of oleic acid (produced by Wako Pure Chemical Industries, Ltd.), the mixture was cooled to a room temperature. After the cooling, the mixture was taken to the atmosphere. In order to break the reverse micelle, a mixed solution of 100 ml water and 100 ml of methanol was added, thus water phase and oil phase were separated. An alloy particle was dispersed in the oil phase. The oil phase was washed 5 times with a mixed solution of 600 ml of water and 200 ml of methanol.

After that, 1,100 ml of methanol was added to flocculate and precipitate the alloy particle. After the supernatant was removed, 20 ml of heptane (manufactured by Wako Pure Chemical Industries, Ltd.) was added to disperse the particle again.

Further, precipitation by adding 100 ml of methanol and dispersion by 20 ml of heptane following the precipitation, were repeated twice. Finally 5 ml of heptane was added to prepare an alloy metal-containing solution containing FePt alloy particle with a mass ratio 2 (water/surfactant) of water and a surfactant.

With respect to the obtained alloy particle, the yield, the composition, the volume average particle diameter, and the distribution (variation coefficient) were measured to obtain the following results.

Incidentally, the composition and the yield were measured by ICP mass spectrometry (Inductively coupled plasma spectrometry).

The volume average particle diameter and the distribution were calculated by measuring the particles photographed by TEM (transmission electron microscope: manufactured by Hitachi Ltd. 30 kV) and processing statistically.

The alloy particle for measurement was alloy particle collected from the produced alloy particle solution, sufficiently dried, and heated in an electric furnace.

composition: FePt alloy with 44.5 at % of Pt
yield: 85%
average particle diameter: 4.2 nm
variation coefficient: 5%

(Oxidation)

Vacuum degassing was carried out so as to adjust the concentration of the alloy particle to be 4% by weight and the resultant alloy particle-containing solution was concentrated. After the concentration, the pressure was turned back to a normal pressure and in order to oxidize the alloy particle, oxygen gas was supplied to the alloy particle-containing solution. The solvent evaporated at the oxidation was compensated by adding heptane. After the oxidation, 0.04 ml of oleylamine was added per 1 ml of the alloy particle-containing solution.

(Annealing)

To the support obtained by firing the surface of a Si support (thickness: 1 mm) to form $SiO_2$ to the depth of about 300 nm from the surface, the alloy particle-containing solution after the oxidation was applied by a spin coater. The coating amount was adjusted so that the amount of the alloy particle became 0.5 g/m².

After the coating, annealing was carried out by heating with a temperature rising rate of 50° C./min in an electric furnace (550° C.) under $N_2$ gas atmosphere for 30 minutes and cooling to a room temperature with a temperature decreasing rate of 50° C./min to form a magnetic layer (film thickness: 50 nm) containing the magnetic particle and a magnetic recording medium was produced.

The flow rate of the $N_2$ gas at the annealing was adjusted to be 200 ml/min. Further, with respect to the alloy particle after oxidation, EXAFS measurement was carried out to find that the bonding length between Fe and oxygen was 19.7 nm and the number of the bonds of Fe with oxygen was 2.2.

Example 2

A magnetic recording medium was produced in the same manner as Example 1, except that a gas mixture of oxygen and nitrogen ($O_2:N_2=1:1$) was used in place of oxygen gas at the oxidation.

With respect to the alloy particle after the oxidation, EXAFS measurement was carried out to find that the bonding length between Fe and oxygen was 19.8 nm and the number of the bonds of Fe with oxygen was 1.8.

Example 3

A magnetic recording medium was produced in the same manner as Example 1, except that the air was used in place of oxygen gas at the oxidation.

With respect to the alloy particle after the oxidation, EXAFS measurement was carried out to find that the bonding length between Fe and oxygen was 19.9 nm and the number of the bonds of Fe with oxygen was 1.5.

Example 4

A magnetic recording medium was produced in the same manner as Example 1, except that H$_2$ gas atmosphere was employed in place of N$_2$ gas atmosphere and the heating temperature was changed to 500° C. at the annealing.

With respect to the alloy particle after the oxidation, EXAFS measurement was carried out to find that the bonding length between Fe and oxygen was 19.7 nm and the number of the bonds of Fe with oxygen was 2.1.

Example 5

A magnetic recording medium was produced in the same manner as Example 4, except that H$_2$ gas atmosphere was employed in place of N$_2$ gas atmosphere and the heating temperature was changed to 400° C. at the annealing.

Example 6

A magnetic recording medium was produced in the same manner as Example 4, except that the heating temperature was changed to be 450° C. at the annealing.

Example 7

A magnetic recording medium was produced in the same manner as Example 6, except that the H$_2$ gas flow rate was changed from 200 ml/min to 600 ml/min and the retention time at 450° C. was changed from 30 minutes to 10 minutes at the annealing.

Example 8

A magnetic recording medium was produced in the same manner as Example 6, except that the H$_2$ gas flow rate was changed from 200 ml/min to 1,200 ml/min and the retention time at 450° C. was changed from 30 minutes to 5 minutes at the annealing.

Comparative Example 1

A magnetic recording medium was produced in the same manner as Example 1, except that nitrogen gas was used in place of oxygen gas at the oxidation.

Comparative Example 2

A magnetic recording medium was produced in the same manner as Example 1, except that argon gas was used in place of oxygen gas at the oxidation.

Magnetic particles were scraped out from the magnetic layers of the respective magnetic recording media obtained by Examples 1 to 8 and Comparative Examples 1 and 2 by a spatula and evaluated in terms of the magnetic property, the volume average particle diameter, and the crystal structure. The results are shown in the following Table 1.

The magnetic property measurement (measurement of coercive force) was carried out by evaluating the magnetic layers together with substrates under condition of applied magnetic field of 790 kA/m (10 kOe) by employing a high sensitive magnetization vector measurement apparatus manufactured by Toei Industry Co., Ltd. and DATA processing apparatus manufactured by the same company.

The volume average particle diameter was measured by already mentioned TEM with 300 kV acceleration voltage.

The analysis of the crystal structure was carried out according to a powder method using a goniometer with tubular voltage of 50 kV, tubular current of 300 mA and CuKα-ray as a radiation source, employing an x-ray diffraction apparatus manufactured by Rigaku Corporation.

TABLE 1

| | | After annealing | | |
| --- | --- | --- | --- | --- |
| | Introduced gas | Volume average particle diameter (nm) | Coercive force (kA/m) | Crystal structure |
| Example 1 | Oxygen | 5 | 276.5 (3500 Oe) | Tetragonal FePt + hematite (partially) |
| Example 2 | Oxygen:nitrogen = 1:1 | 5 | 252.8 (3200 Oe) | Tetragonal FePt |
| Example 3 | Air | 5 | 260.7 (3300 Oe) | Tetragonal FePt |
| Example 4 | Oxygen | 5 | 387.1 (4900 Oe) | Tetragonal FePt |
| Example 5 | Oxygen | 5 | 250 (3165 Oe) | Tetragonal FePt |
| Example 6 | Oxygen | 5 | 355.5 (4500 Oe) | Tetragonal FePt |
| Example 7 | Oxygen | 5 | 347.6 (4400 Oe) | Tetragonal FePt |
| Example 8 | Oxygen | 5 | 331.8 (4200 Oe) | Tetragonal FePt |
| Comparative Example 1 | Nitrogen | 5 | 15.8 (200 Oe) | Cubic FePt |
| Comparative Example 2 | Argon | 5 | 14.22 (1800 Oe) | Cubic FePt |

According to Table 1, in the case of Comparative Examples 1 and 2, the obtained magnetic particles still had cubic disorder phase with a low coercive force (Hc), meanwhile the magnetic particles of the magnetic recording media of Examples 1 to 8 subjected to the oxidation were found having high coercive force.

That was supposedly attributed to that the oxidation made it possible to lower the phase transformation temperature to the temperature lower than those in the case of Comparative Examples.

Further, in Examples 4 to 8, the annealing was carried out in hydrogen atmosphere, so that high coercive force (Hc) was obtained and the starting temperature of the transformation could be lowered to the temperature lower than that in other Examples. Particularly, in Examples 7 and 8, the annealing period could be shortened.

Example 9

A layer containing alloy particle that can form CuAu type hard magnetic order alloy phase on a support (quartz substrate, thickness: 1.25 mm) was formed by RF sputtering method using a sputter target composed of an FePt alloy (Fe/Pt=1 by atomic composition ratio).

The sputtering conditions were as follows:
substrate temperature: 450° C.;
sputtering gas pressure: 50 Pa; and
target-substrate distance: 95 mm.

After the foregoing layer was formed, oxidation was carried out. The oxidation was carried out by holding (exposing) each specimen at a room temperature (25° C.) for 6 hours in air. After that, annealing was carried out by heating with a temperature rising rate of 50° C./min in an electric furnace (450° C.) under H$_2$ gas atmosphere for 30 minutes and cooling to a room temperature with a temperature decreasing rate of 50° C./min to form a magnetic layer (film thickness: 50 nm) containing the magnetic particle and a magnetic recording medium was produced.

Example 10

A layer (about 30 nm) containing alloy particle that can form CuAu type hard magnetic order alloy phase on a support was formed by RF sputtering method using a sputter target composed of an CoPt alloy (Co/Pt=1 by atomic composition ratio). A quartz substrate (thickness: 1.25 mm) was used as the support. The sputtering conditions were the same as those of Example 9. The annealing was carried out in the same manner as Example 9 to form a magnetic layer and a magnetic recording medium was produced.

Example 11

A magnetic recording medium was produced in the same manner as Example 9, except that the atmosphere of the annealing was changed from $H_2$ gas to $N_2$ gas.

Example 12

A magnetic recording medium was produced in the same manner as Example 10, except that the atmosphere of the annealing was changed from $H_2$ gas to $N_2$ gas.

Comparative Example 3

A magnetic recording medium was produced in the same manner as Example 9, except that the oxidation was not carried out. Incidentally, a series of the steps from finishing the sputtering to the production of the magnetic recording medium were carried out in $N_2$ gas for preventing the oxidation of the alloy particle or the like.

Comparative Example 4

A magnetic recording medium was produced in the same manner as Example 10, except that the oxidation was not carried out. Incidentally, a series of the steps from finishing the sputtering to the production of the magnetic recording medium were carried out in $N_2$ gas for preventing the oxidation of the alloy particle or the like.

The magnetic property evaluation of the magnetic layers of the respective magnetic recording media obtained by Examples 9 to 12 and Comparative Examples 3 and 4 together with the substrates in the same manner as Example 1 and the like. The results are shown in the following Table 2.

TABLE 2

| | | Annealing treatment | | Coercive force (kA/m) after annealing |
|---|---|---|---|---|
| | Oxidation | Atmosphere | Temperature | |
| Example 9 | With oxydation | Hydrogen | 450° C. | 395 (5000 Oe) |
| Example 10 | With oxydation | Hydrogen | 450° C. | 316 (4000 Oe) |
| Example 11 | With oxydation | Nitrogen | 450° C. | 237 (3000 Oe) |
| Example 12 | With oxydation | Nitrogen | 450° C. | 197.5 (2500 Oe) |
| Comparative Example 3 | Without oxydaton | Nitrogen | 450° C. | 47.4 (600 Oe) |
| Comparative Example 4 | Without oxydation | Nitrogen | 450° C. | 39.5 (500 Oe) |

As shown in Examples 9 to 12, due to the oxidation, higher magnetic properties (coercive forces) than those of Comparative Examples 3 and 4 in which no oxidation treatment was carried out, was obtained. Also as shown in Examples 9 and 10, by employing the hydrogen atmosphere at the annealing treatment, the magnetic property could be further improved while the treatment temperature was kept at a low temperature.

As described above, the invention can provide a production method capable of particularly producing a magnetic particle with hard magnetism without increasing the temperature at the time of annealing, a magnetic particle produced by the production method, and a magnetic recording medium comprising a magnetic layer containing the magnetic particle.

The invention claimed is:

1. A method of producing a magnetic recording medium including forming on a support a layer containing an alloy that can form a hard magnetic alloy phase having a CuAu or $Cu_3Au$ ordered structure, oxidizing the layer, and annealing the layer in a reducing atmosphere at an annealing temperature of 450° C. or lower and a retention time of 10 minutes or shorter.

2. The method of producing a magnetic recording medium according to claim 1, which comprises forming on a support a layer containing an alloy selected from the group consisting of FeNi, FePd, FePt, CoPt and CoAu.

3. The method of producing a magnetic recording medium according to claim 1, which comprises forming on a support a layer containing an alloy selected from the group consisting of $Ni_3Fe$, $FePd_3$, $Fe_3Pt$, $FePt_3$, $CoPt_3$, $Ni_3Pt$, $CrPt_3$ and $Ni_3Mn$.

4. The method according to claim 1, wherein the reducing atmosphere includes $H_2$.

5. The method according to claim 1, wherein the alloy is produced by a liquid phase method.

6. The method according to claim 1, wherein the alloy is produced by a reverse micelle method.

* * * * *